United States Patent
Lu et al.

(10) Patent No.: US 7,269,133 B2
(45) Date of Patent: Sep. 11, 2007

(54) IS-IS HIGH AVAILABILITY DESIGN

(75) Inventors: Xiaomei Lu, Plano, TX (US); Ronald P. Folkes, Dallas, TX (US); Lance A. Visser, Dallas, TX (US)

(73) Assignee: Jeremy Benjamin, Tel Aviv (IL)

( * ) Notice: Subject to any disclaimer, the term of this patent is extended or adjusted under 35 U.S.C. 154(b) by 1065 days.

(21) Appl. No.: 10/233,704

(22) Filed: Sep. 3, 2002

(65) Prior Publication Data
US 2004/0042395 A1 Mar. 4, 2004

(51) Int. Cl.
*G06F 11/00* (2006.01)
*H05K 10/00* (2006.01)

(52) U.S. Cl. .......................... 370/219; 714/4; 709/238

(58) Field of Classification Search ................ 370/216, 370/217, 218, 219, 220, 225; 714/2, 15; 709/238
See application file for complete search history.

(56) References Cited

U.S. PATENT DOCUMENTS

| | | | | |
|---|---|---|---|---|
| 6,070,187 A | * | 5/2000 | Subramaniam et al. ...... | 709/220 |
| 6,529,481 B2 | * | 3/2003 | Akyol et al. ................ | 370/250 |
| 6,804,018 B1 | * | 10/2004 | Mochizuki ................. | 358/1.14 |
| 6,820,134 B1 | * | 11/2004 | Zinin et al. ................. | 709/238 |
| 2002/0064132 A1 | | 5/2002 | Akyol et al. | |
| 2003/0056138 A1 | * | 3/2003 | Ren ............................. | 714/4 |
| 2004/0078619 A1 | * | 4/2004 | Vasavada ....................... | 714/4 |

FOREIGN PATENT DOCUMENTS

WO WO 2004/004247 1/2004

OTHER PUBLICATIONS

U.S. Appl. No. 09/852,233, Watson et al.
U.S. Appl. No. 10/153,500, Folkes et al.
Martey, Abe, "IS-IS Network Design Solutions," Cisco Press, Indianapolis, IN, 2002.
Callon, R., "Use of OSI-IS for Routing in TCP/IP and Dual Environments," RFC 1195, Dec. 1990.
Information Technology—Telecommunications and Information Exchange Between Systems—Intermediate System to Intermediate System Intra-Domain Routeing Information Exchange Protocol for Use in Conjunction with the Protocol for Providing the Connectionless-Mode Network Service (ISO 8475), ISO/IEC 10589, 1992.
European Search Report issued for EP 03255441.2 dated Feb. 23, 2006.

\* cited by examiner

*Primary Examiner*—Eliseo Ramos-Feliciano
*Assistant Examiner*—Wanda Z Russell
(74) *Attorney, Agent, or Firm*—The Nath Law Group; Harold Novick

(57) ABSTRACT

The HA IS-IS system provides a redundant backup IS-IS protocol instance that can seamlessly assume the function of the active IS-IS instance in the event of active MCP failure. Once the backup is online, the active synchronizes its global, interface, adjacency, neighbor, and LSP system state information. In the ongoing synchronization phase, the active and the backup maintain synchronization using a combination of explicit message updates from active to backup together with message flow-through. In the recovery phase, the operating system detects the failure of the active and notifies the backup, which assumes the active function as a standalone system without reconfiguring or interrupting traffic among peer network routers, and starts computing forwarding tables and updating routing tables.

9 Claims, 4 Drawing Sheets

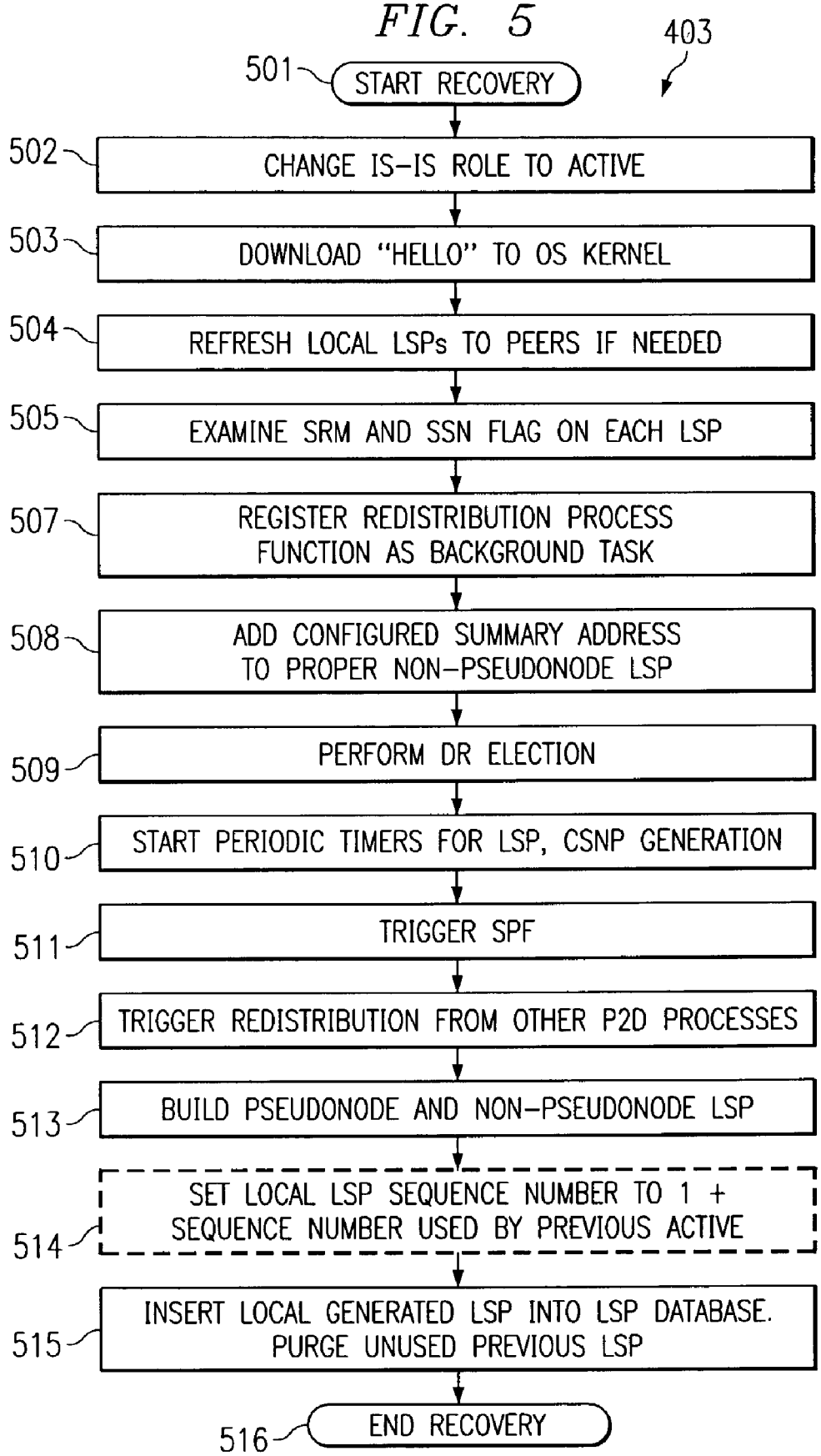

IS-IS HIGH AVAILABILITY DESIGN

CROSS-REFERENCE TO RELATED APPLICATIONS

This application is related to co-pending and commonly assigned U.S. patent application Ser. No. 09/852,223, entitled "SYSTEM AND METHOD FOR TCP CONNECTION PROTECTION SWITCHING," filed May 9, 2001, and Ser. No. 10/153,500, entitled "HIGHLY AVAILABLE OSPF ROUTING PROTOCOL," filed May 23, 2002, the disclosures of which are hereby incorporated herein by reference.

TECHNICAL FIELD

This invention relates to network communication protocols and more particularly to IS-IS high availability design.

BACKGROUND OF THE INVENTION

IS-IS stands for Intermediate System to Intermediate System. Initially it was introduced by "Intermediate system to Intermediate system routing information exchange protocol for use in conjunction with the Protocol for providing the Connectionless-mode Network Service (ISO 8473)", ISO/IEC 10589 (1992). It was originally designed for the connectionless network, and then it was enhanced by Callon, R., "OSI IS-IS for IP and Dual Environment", RFC 1195 (December 1990), so that IS-IS can be used on the IP network.

BRIEF SUMMARY OF THE INVENTION

The present invention is directed to a system and method for IS-IS high availability (HA) protocol. The HA IS-IS system provides a redundant backup instance of the IS-IS protocol on a separate master control processor (MCP) that can assume the function of the active IS-IS instance in the event the active MCP fails. When the active instance fails, then the backup will automatically initiate and enable the routing protocol and the routing PDU process to continue to provide an accurate forwarding table for data traffic. The process is divided into three different phases: first initial synchronization, second ongoing synchronization, and third recovery.

In the initial synchronization there are two scenarios—one in which the active instance has been running stand-alone for a while, and then the backup instance is initiated. In the second scenario, both active and backup start at the same time. In either scenario, once the backup is online, then the active synchronizes to the backup the system state, the sum of the LSPs, and adjacencies.

In the ongoing synchronization phase, the active and the backup process the PDUs essentially individually, following specific steps, for example, to maintain the IS-IS adjacency and also to maintain the LSP to make sure those are synchronized. The ongoing state of the backup IS-IS instance is dynamically synchronized with the active IS-IS instance using a combination of explicit message updates from active IS-IS instance to backup IS-IS instance together with a message flow-through mechanism.

When the active fails, as detected by the operating system, the backup is either notified directly of the failure through a message from the active or indirectly through timers on the backup expiring. After the backup is notified, the backup enters the recovery phase. The backup then assumes control and starts to function as a stand-alone system without reconfiguring or interrupting traffic among peer network routers. It will also start computing the forwarding table and keeping the routing table updated.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 5 is a flow diagram depicting the third or recovery synchronization phase of HA IS-IS.

| GLOSSARY OF ACRONYMS | |
|---|---|
| CLI | Command Line Interface |
| CLNP | Connectionless Network Protocol |
| CLNS | Connectionless Network Service |
| DRP | Dynamic Routing Protocol |
| HA | High-Availability |
| IS-IS | Intermediate System to Intermediate System |
| ISO | International Organization for Standardization |
| LSP | Link State PDU |
| MCP | Master Control Processor |
| MIB | Management Information Base |
| MNET | MCP Net |
| PDU | Protocol Data Unit |
| PM | Protection Monitor |
| PRC | Partial Route Calculation |
| PSS | Platform Service System |
| RIB | Routing Information Base |
| RNET | Routing Net |
| SRM | Send Routing Message |

| | GLOSSARY OF ACRONYMS |
|---|---|
| SSN | Send Sequence Number |
| SPF | Shortest Path First |

DETAILED DESCRIPTION OF THE INVENTION

Figure 1:
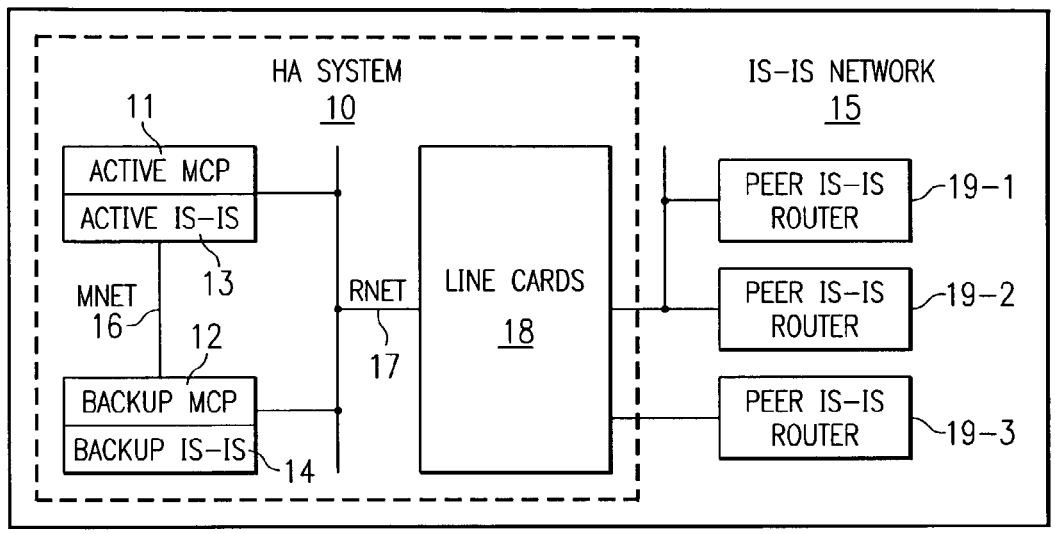
FIG. 1 is a block diagram illustrating components involved in HA IS-IS.

FIG. 1 is a block diagram illustrating components involved in HA IS-IS. Inside dashed lines 10 are HA related components on a router. There are two MCPs, active 11 and backup 12. IS-IS routing protocol is running on each of the MCPs. Active IS-IS instance 13 provides the routing function for IS-IS network 15. Upon failure of active MCP, backup MCP 12 takes control. At that time, backup IS-IS instance 14 running on backup MCP 12 assumes the active role and starts performing the routing function. In the description below, backup IS-IS instance is named "backup instance" or "backup," and active IS-IS instance is named "active instance" or "active". MCP Net (MNET) 16 and Routing Net (RNET) 17 are used by HA system 10 to communicate routing packets and HA related information. Line cards 18 use the routing information to deliver transit traffic packets across IS-IS network 15. Peer routers, for example routers 19-1 through 19-3, will not detect the switchover when backup MCP 12 takes control. HA IS-IS provides the following features:

The fail-over of IS-IS instances 13, 14 does not cause other IS-IS routers 19-1 through 19-3 in network 15 to detect a topology change.

When fail-over occurs, new active IS-IS instance 14 assume control of all IS-IS neighbor relationships without dropping any adjacencies.

Active and backup IS-IS instances 13, 14 can synchronize state regardless of how long active instance 13 has been running.

Active and backup IS-IS instances 13, 14 can run different software versions, thereby supporting in-service software upgrade.

HA IS-IS allows differences between active and backup instances, for example IS-IS does not maintain a routing information base (RIB) on backup MCP 12. Nor does IS-IS run a route decision calculation such as SPF or PRC on the backup. Any information related to the RIB or route decision calculation cannot be retrieved from backup IS-IS instance 14 via CLI command or MIB until the information has been recalculated during recovery.

Figure 2:
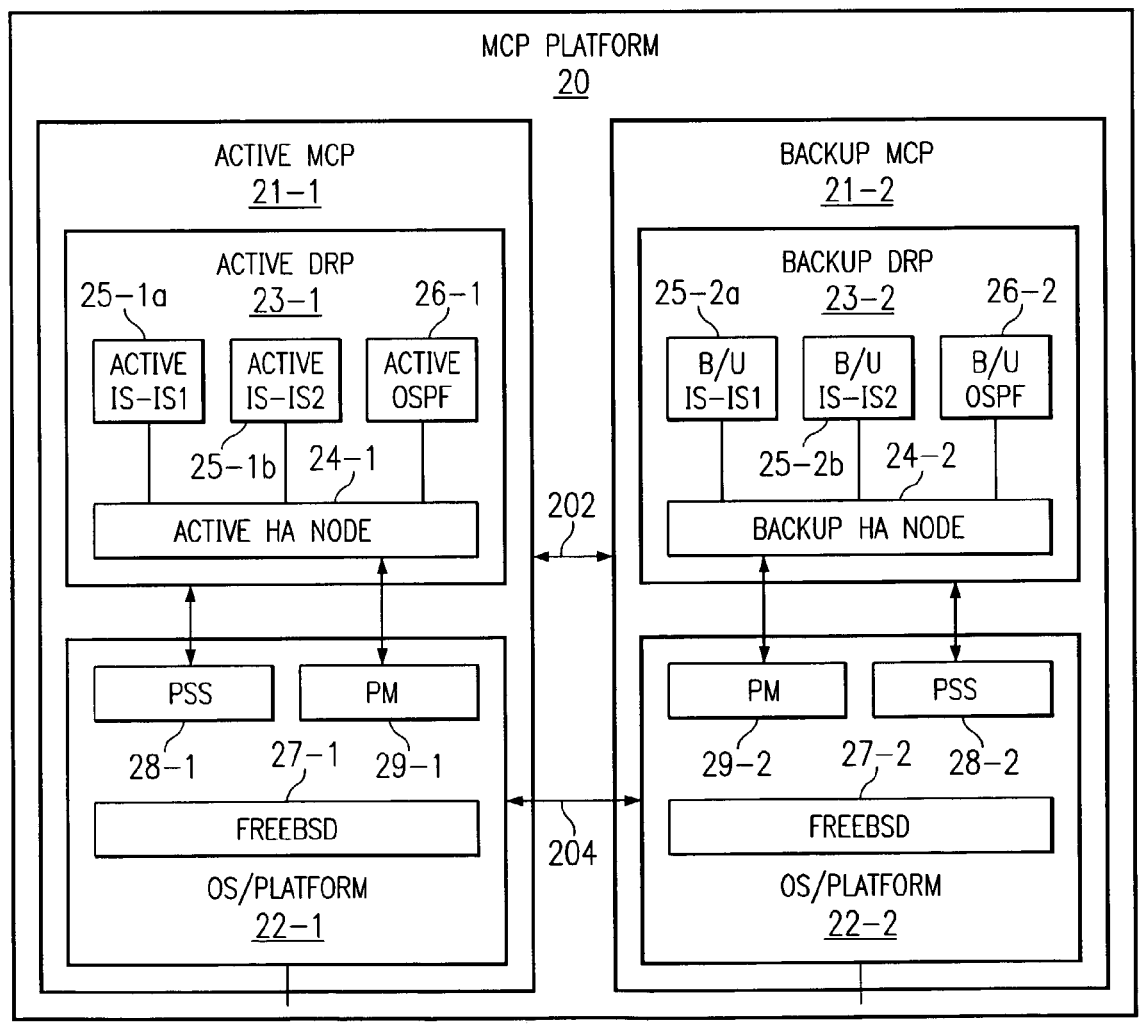
FIG. 2 is a block diagram depicting an overview of MCP software architecture in a HA IS-IS embodiment.

FIG. 2 is a block diagram depicting an overview of MCP software architecture in a HA IS-IS embodiment.

MCP protection monitor (PM) 29-1, 29-2 is the software process that runs on each MCP 21-1, 21-2, respectively, and is responsible for coordinating high availability (HA) activities. There are two links between MCP 21-1 and 21-2, namely GbE Ethernet connection 202 and RS232 serial link 204. PM 29-1, 29-2 uses HA protocol over these two links 202, 204 to determine when it is possible and/or necessary to do a switchover from active MCP 21-1 to backup MCP 21-2. PM 29-1, 29-2 provides failure detection and triggers the fail-over when active MCP 21-1 fails. When fail-over occurs, Dynamic Routing Protocols (DRPs) 23-1 and 23-2 are informed. PM 29-1, 29-2 also informs DRP 23-1, 23-2 about HA state changes on MCP 21-1, 21-2. Further information is found in co-pending and commonly assigned U.S. patent application Ser. No. 09/852,223, cited above, the disclosure of which has been incorporated herein by reference.

MCP operating system, for example Chiaro OS platform 22-1, 22-2 based on FreeBSD 27-1, 27-2, provides raw CLNS flow-through between backup and active IS-IS instances 25-1*a*, 25-1*b* using RNET 17, MNET 16, flow MAC address, platform service system (PSS) 28-1, 28-2 and PM 29-1, 29-2. When PM 29-1 and 29-2 on active and backup MCPs 21-1 and 21-2 detect each other, each PM informs respective PSS 28-1, 28-2, which activates mirrored interfaces on backup MCP 21-2. A pair of interfaces on active and backup MCPs 21-1, 21-2 are assigned the same interface index and IP address. PSS 28-1, 28-2 has a unique floating MAC address (called FlowMac) for each interface, that supports and configures the flow-through function. PSS 28-1, 28-2 assigns the FlowMac address to one of the MCP interfaces.

Figure 3A:
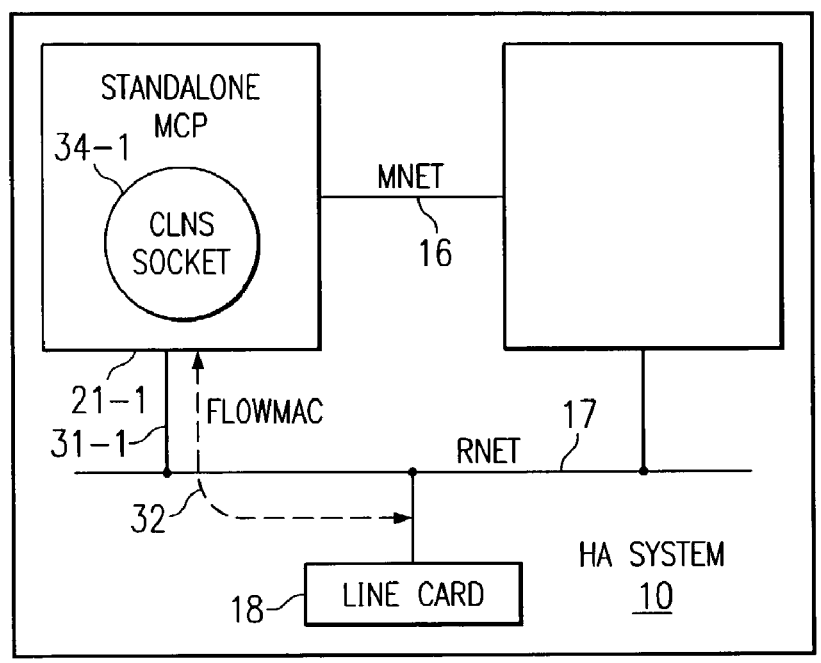
FIGS. 3A-3B are block diagrams illustrating routing of protocol packets from line card 18 using RNET 17 based on FlowMac.
Figure 3B:
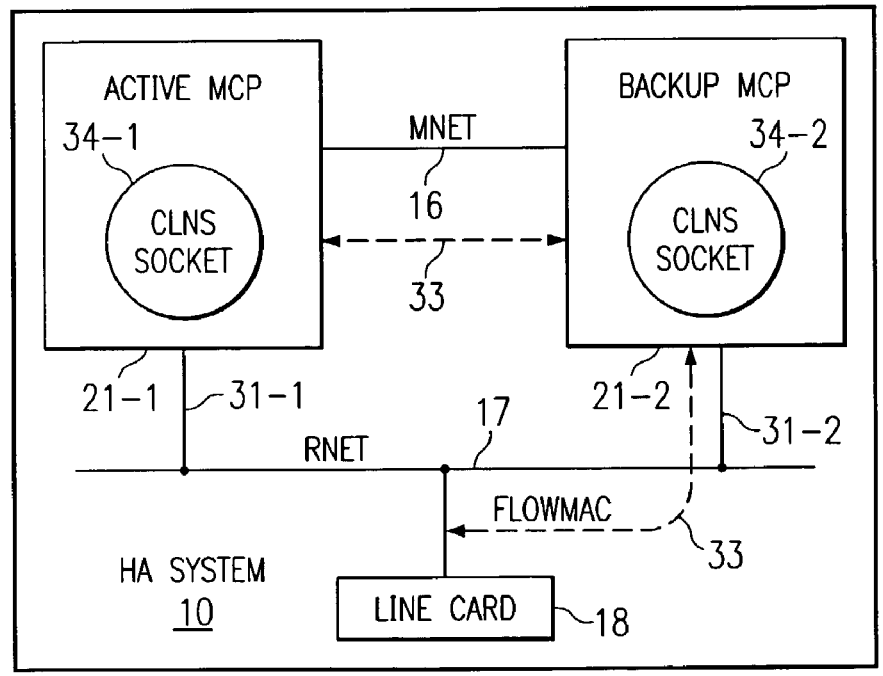

Line card 18 uses RNET 17 to route IS-IS protocol packets based on FlowMac address, as illustrated in FIGS. 3A-3B. If active MCP 21-1 is operated as a standalone system as shown in FIG. 3A, then PSS 28-1 assigns the FlowMac address to active MCP interface 31-1. Routing protocol traffic then flows from line card 18 to active MCP 21-1 as indicated by dashed line 32. Alternatively, if active MCP 21-1 is protected by backup MCP 21-2 as shown in FIG. 3B, then PSS 28-2 assigns the FlowMac address to backup MCP interface 31-2. Incoming routing protocol traffic then flows from line card 18 to backup MCP 21-2 over RNET 17 and from there to active MCP 21-1 via MNET 16. Outgoing traffic from active instance 13 on active MCP 21-1 is then sent first to backup instance 14 on backup MCP 21-2 and from there goes to line card 18 as depicted by dashed lines 33 for the protected system shown in FIG. 3B.

Active IS-IS instance 13 retains all its original function in the protected environment and is additionally responsible for synchronization processes not done by flow-through. Active IS-IS instance 13 uses explicit HA IS-IS messages to synchronize backup IS-IS instance.

HA IS-IS depends on the following functions provided in the MCP dynamic routing protocol environment (see FIG. 2).

HA node 24-1, 24-2 provides state information to MCP to indicate which MCP (active 21-1 or backup 21-2) the IS-IS instance 25-1*a*, 25-1*b*, 25-2*a*, 25-2*b* is on.

HA node 24-1, 24-2 provides the synchronizing DRP configuration between active 21-1 and backup 21-2 instances of MCP. CLI commands are sent to both active and backup IS-IS instances.

HA node 24-1, 24-2 creates TCP connection over GbE ethernet (MNET) 202 between active 21-1 and backup 21-2 MCP instances to exchange HA related messages.

OS/platforms 22-1, 22-2 forward raw CLNS packets via GbE ethernet connection 202 between active and backup MCP 21-1, 21-2.

When fail-over occurs, PM 29-2 informs backup HA IS-IS node 24-2 to become the new active IS-IS instance.

HA IS-IS runs on a hardware platform that is provided by the master control processor (MCP). The PM detects whether the backup is online or not and detects whether the active failed or not. Platform Service System (PSS) 28-1 synchronizes the interfaces on active and backup to make sure that active and backup have the same interface state. Also, PSS 28-1 synchronizes the MAC address and/or the IP address on active and backup, to ensure using the right data when sending PDU, such that peer routers will not detect that there are two separate protocol instances. Based on the data, including the "floating MAC" address, IP address, router id and the system id in the packet they received, the peer routers will all detect only a single IS-IS instance. HA node 24-1 synchronizes the Command Line Interface (CLI), such that when the user types in a command from the active, the command is sent to the CLI script server on the backup. The CLI script server sends the command to routing protocol instance so that the user does not need to configure anything separately from the backup.

The IS-IS HA model depends on a data flow-through mechanism that is provided by the operating system. That is, if the backup IS-IS is in the protect state, peer protocol traffic is sent first to the backup and then is forwarded to the active. In the same way, PDU created by the active travel first to backup and then out to the peer routers. Consequently, both active and backup see the same PDU.

HA IS-IS design takes an approach similar to OSPF HA design, incorporating a hybrid of flow-through and explicit models. For further information, see co-pending and commonly assigned U.S. patent application Ser. No. 10/153,500, cited above, the disclosure of which has been incorporated herein by reference.

In the flow-through model, the network routing packets are received and processed by the backup IS-IS instance first. Backup IS-IS performs limited message processing required to maintain state synchronization. Only the active IS-IS instance actually originates responses to peer routers. Outgoing packets flow through backup MCP 21-2 and are queued to backup IS-IS instance CLNS socket 34-2 that was created in operating system 22-2 on the backup when the IS-IS instance is created on the backup before the packets are transmitted to peer routers. There is one CLNS socket per DRP, e.g. CLNS socket 34-1 shown inside standalone/active MC 21-1 and CLNS socket 34-2 shown inside backup MCP 21-2. The flow-through model uses encapsulated raw CLNS packets that flow through MNET 202 to transfer IS-IS routing packets. The backup IS-IS uses this approach to maintain up-to-date LSP database and neighbor relationships.

In the explicit model, at certain points active IS-IS instance constructs and sends a message to backup instance for state synchronization. Backup IS-IS instance updates the state and then, depending on message type, explicitly acknowledges active instance. This approach is used in initial IS-IS instance synchronization and in local LSP synchronization. Referring again to FIG. 2, the explicit model uses the TCP/IP connection over MNET 202 created by HA node 24-1, 24-2 to transfer HA related information between active and backup instances.

Figure 4A:
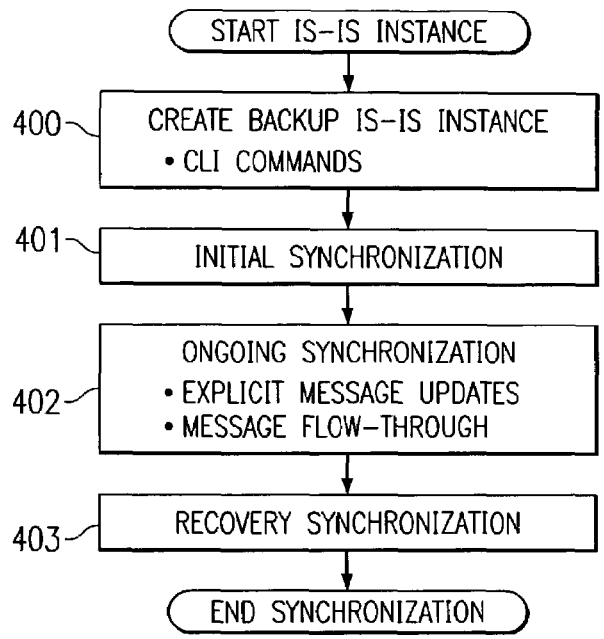
FIG. 4A is a flow diagram depicting the three synchronization phases involved in HA IS-IS protection of the active MCP.

FIG. 4A is a flow diagram depicting the three synchronization phases involved in HA IS-IS protection of the active MCP, namely initial synchronization 401, ongoing synchronization 402, and recovery synchronization 403. There are two scenarios in which a MCP is protected:

MCP running as a standalone system and then backup MCP brought on line, as depicted at step 400 of FIG. 4A.

Two MCPs brought up roughly at same time. MCP PM decides the role of each MCP. One becomes the active and the other becomes the backup.

In both cases, PM informs DRP of its HA role. Active DRP starts initial synchronization. The configuration on active MCP is sent to backup MCP for processing. Then active HA node triggers each HA-aware process to start its initial synchronization process.

In HA IS-IS, it is important to define the role of the backup, for example how much the backup needs to know, and how active or how passive that role is. The backup instance needs just enough information to allow it to assume active role when a fail-over occurs. That differs with each of the three different synchronization phases in the IS-IS HA system as depicted in FIG. 4A, namely initial synchronization 401, ongoing synchronization 402, and recovery synchronization 403.

Backup instance is created by CLI commands issued during configuration synchronization, as depicted at step 400 of FIG. 4A. All CLI commands configured on active instance are sent to backup instance for processing.

After configuration synchronization, active IS-IS instance, if created, transmits IS-IS information (LSP DB, adjacency information, interface state, etc.) to backup for synchronization. After backup instance processes this information, it is basically synchronized with active instance.

Backup instance receives flow-through IS-IS packets destined for active IS-IS from raw-CLNS socket 34-2. Backup processes all IS-IS routing Protocol Data Units (PDUs). It processes the "Hello" PDU to maintain the adjacency database. Backup instance processes neighbor LSP information to update the link state PDU (LSP) database. Backup processes CSNP and PSNP PDUs as well. Backup IS-IS instance does not transmit any IS-IS routing packets. It updates internal LSP database and sets SRM and SSN flags according to the ISO 10589 update process.

Backup instance snoops IS-IS routing PDUs sent by active instance on MNET 202. Backup IS-IS instance examines LSPs/PSNPs flooded by active instance. It clears the SRM/SSN flags based on ISO 10589 assuming it has transmitted these packets.

Backup IS-IS instance maintains the hold time list for LSPs and purges expired LSPs as indicated by ISO 10589. When its purge time expires, backup instance deletes a LSP from its LSP database.

Backup instance creates/deletes an LSP if it is told by active IS-IS instance via an explicit HA IS-IS message.

Backup monitors LSP flooding. If LSP flooding is not completed at the time a fail-over occurs, backup instance continues LSP flooding.

Backup IS-IS instance starts the recovery process when it is detected by HA node that fail-over occurs.

Backup maintains but does not process the summary address into LSP.

Backup instance will not execute the SPF algorithm.

Backup instance will not add any routes to the RIB.

Backup instance will not transmit any IS-IS messages to peer routers.

Backup instance does not process any route redistribution.

Usually active sends HA message to backup, and backup responds to active. There is a scenario in which the backup needs to initiate HA communication, described in paragraph [0055].

Backup instance does not maintain LSP and PSNP transmit queues. Transmit queues are rebuilt during recovery process, when backup instance is notified to take over the active role.

IS-IS active instance starts initial synchronization phase 401 when it is informed that backup instance is up. Active instance sends START SYNC and COMPLETE SYNC message respectively during this period. Backup responds to these two messages explicitly.

Active IS-IS instance implements the following state machine to achieve HA synchronization with backup:

| State | Event | Action | New State |
|---|---|---|---|
| HAIS_ISST_NO_SYNC (Initial state) | DRP config sync complete | Send START SYNC message to backup IS-IS instance | HAIS_ISST ACT_NO_SYNC |
| HAIS_ISST_ACT_NO_SYNC | Receive START SYNC response from backup IS-IS | Send explicit sync messages for complete IS-IS state, send COMPLETE SYNC at end | HAIS_ISST_ACT_NO_SYNC |
| HAIS_ISST_ACT_NO_SYNC | Receive COMPLETE SYNC ack from backup when at least one IS-IS adjacency exists | Waiting for first flow-through indication on CLNS-socket | HAIS_ISST_ACT_START_FT |
| HAIS_ISST_ACT_NO_SYNC | Receive COMPLETE SYNC ack from backup when no IS-IS adjacency exists | | HAIS-IS_ACT_FULL_SYNC |
| HAIS_ISST_ACT_START_FT | Receive first flow-through indication on CLNS socket | | HAIS-IS_ACT_FULL_SYNC |

Backup IS-IS instance implements the following state machine to achieve HA synchronization with active:

| State | Event | Action | New State |
|---|---|---|---|
| HAIS-IST_NO_SYNC (Initial state) | DRP config sync complete | | HSIS-ISST_BACK_INIT_SYNC |
| HAIS-ISST_BACK_INIT_SYNC | Receive START SYNC message from active IS-IS | Send START SYNC ack to active IS-IS. Start to process state sync message. | HAIS-ISST_BACK_INIT_SYNC |
| | Receive complete sync message from active | Send complete sync ack to active | HAIS-ISST_BACK_FULL_SYNC |

Figure 4B:
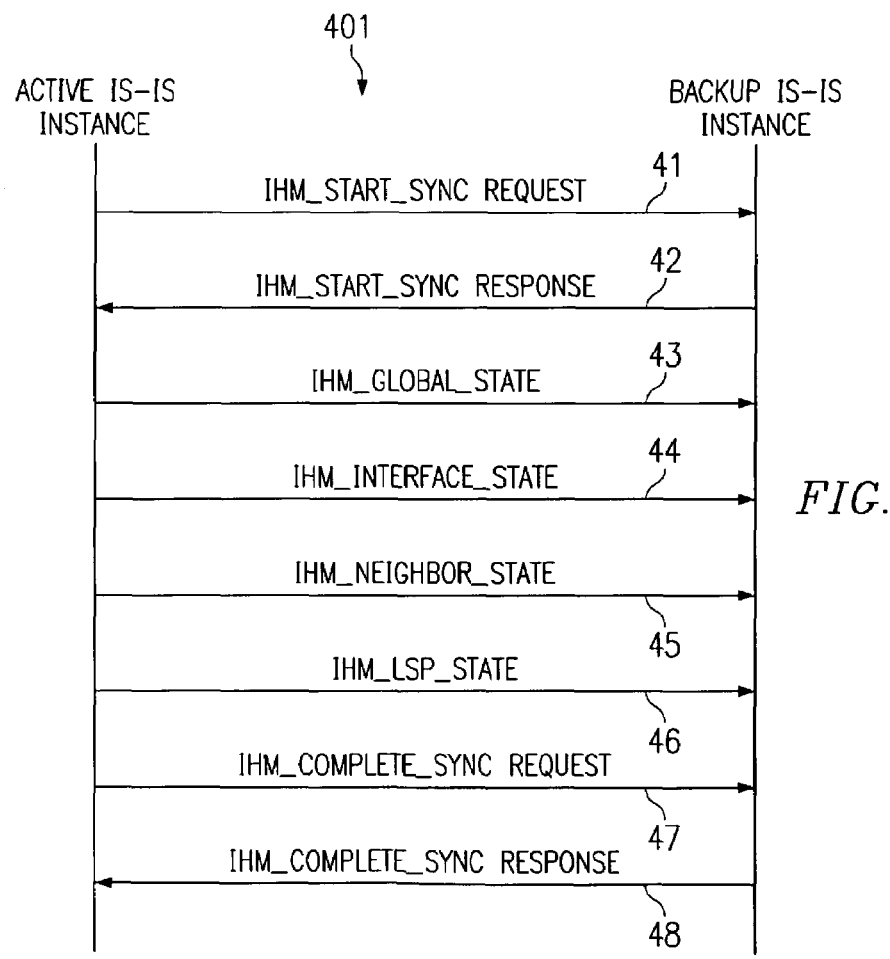
FIG. 4B is a flow diagram depicting HA IS-IS first phase of initial synchronization.

FIG. 4B is a flow diagram depicting HA IS-IS first phase of initial synchronization 401. Referring again to FIG. 2, when protection monitor (PM) 29-1 detects that backup 25-2a, 25-2b comes online, the CLI script is responsible for forwarding all configuration information to backup 25-2a, 25-2b. Once that is done, all the configuration has been provisioned and executed on backup 25-2a, 25-2b, such that the backup has all the IS-IS interface configuration and node configuration. Then to synchronize databases on active 25-1a, 25-1b and backup 25-2a, 25-2b, active sends a START SYNC message at step 41 of FIG. 4B.

Each active IS-IS instance sends a START SYNC request to backup. The IS-IS instance tag name is sent with the START SYNC message. When backup finds IS-IS instance with a given tag name, it responds with a START SYNC response at step 42. Once active receives the backup START SYNC response at step 42, then it starts to transmit information to backup for synchronization (each message containing the IS-IS tag name so that backup IS-IS instance can process it correctly). First it sends global state messages to the backup at step 43. The system up time is included in this message. The system up time is synchronized. It allows the time specific command (e.g. "set-overload-bit on-startup <time>" to be run correctly on backup after switch-over. The default router ID selected by active is also synchronized in this stage. Then at step 44 an interface synchronization message is sent for each IS-IS interface over the HA TCP socket. The interface ID and interface name are included in this message. It is used by backup instance to make sure the interface information is mirrored correctly by the MCP. The LAN ID for L1 and L2 and the DR state for L1 and L2 are sent to backup. To support more than 256 interfaces, each LAN interface is assigned a unique pnode ID. The pnode ID is sent to backup in the interface state synchronization message.

Then at step 45 adjacency information for each established adjacency is sent, including how long this adjacency has been up, adjacency type, adjacency state, adjacency usage, adjacency priority, the protocol that the adjacency is supporting, and also the adjacency interface name, the adjacency network ID, the LAN ID and IP information. Although backup IS-IS starts to process "Hello" PDU immediately after it is created, it takes time to discover all neighbors. During this time, backup IS-IS instance may drop IS-IS PDU updates from its neighbors. Active IS-IS instance sends the neighbor state to bring backup IS-IS instance into synchronization.

After synchronization of interfaces and adjacencies, then at step 46 HA IS-IS synchronizes the LSP for each LSP to send the LSP information to backup 25-2a, 25-2b to help the backup construct the LSP database. Active sends its entire LSP database to backup. Backup creates a LSP database that is synchronized with active.

Then at step 47 active instance 25-1a, 25-1b sends a COMPLETE SYNC message to backup 25-2a, 25-2b, and at step 48 the backup sends a COMPLETE SYNC response. With those synchronizations, both active and backup are synchronized at that point in terms of LSP database and neighbor adjacency information. After backup instance processes this information, it is basically initially synchronized with active IS-IS instance.

During initial synchronization, the active needs to suspend new LSP update and new adjacency update to maintain active and backup database synchronization. The active drops new LSP update and new IS-IS adjacency requests during this stage. When the active receives the COMPLETE SYNC acknowledgment, it knows the backup is fully synchronized. At this time, if there is no IS-IS adjacency, the active declares itself as fully synchronized and starts to process all CLNS PDU normally. If there is IS-IS adjacency, the active waits until the CLNS packets flowing through the MNET arrive. When the backup receives the first CLNS PDU from peer routers, the kernel sets a sync-bit in the packet and flows the packet to the active. Once the active receives the CLNS packet with the sync-bit, it moves into the fully synchronized state.

The second phase of the HA IS-IS process is ongoing synchronization. In this phase, the backup and active need to maintain adjacency database and LSP database synchronization. The active and the backup each process "Hello" PDUs independently, as well as the LSP and the partial sequence number packets and complete sequence number packets (PSNP/CSNP). The backup can monitor PDU transmitted by the active and thus update the local LSP generated by the active. But there are some specific cases needed to explicitly synchronize both databases, for example the local LSP update. When the active instance is performing local LSP updates, sometimes they are not transmitted out. For example, if there is no IS-IS adjacency on the active IS-IS instance, local LSP updates then cannot transmit out. In that case, explicit HA messages send this LSP update from active to backup. Also, when the LSP is deleted, to make sure the active and backup are synchronized properly, explicit messages send the LSP deletes over to the backup. Similarly, if an adjacency is deleted, then an explicit message is sent from active to backup to remove that adjacency.

Due to the fact that active and backup run with different time systems, the LSP might be deleted at different times. To solve the problem, whenever an LSP is deleted on the active side, an explicit IS-IS HA delete message is sent to backup. Backup IS-IS instance deletes the given LSP once the explicit IS-IS HA delete message is received.

Another requirement is to synchronize the Send Routing Message (SRM) flag and the Send Sequence Number (SSN) flag, because only the active and not the backup transmits PDU. The backup needs to know on which interface the PDU are flooded. In IS-IS when LSP is received from one interface, it needs to set the SRM flag on all the interfaces which have a neighbor, excepting the receiving interface. When the LSP is transmitted on an interface, the LSP's SRM flag on the interface is cleared. The backup needs to know when the LSP is transmitted on an interface, so that it can clear the LSP's SRM flag on this interface. To do that, the backup needs to know the traffic that flows through the active, and must correctly maintain SRM and the SSN flag on each LSP according to ISO 10589 update process.

Based on ISO 10589, the SRM/SSN flags are cleared when the LSP/PSNP is transmitted. Due to the fact that only active IS-IS instance transmits the IS-IS PDUs, backup does not know when to clear the SRM and SSN flags. Backup does not know the exact time a LSP/PSNP is transmitted by active on a specific interface.

To solve the problem, backup instance snoops the IS-IS routing traffic sent by active instance. Packets from active IS-IS instance are sent to backup IS-IS instance through the raw CLNS socket exception handler. Backup IS-IS instance examines LSPs/PSNPs flooded by active instance. If a LSP is sent on interface c1, backup instance clears the SRM flag on the LSP on interface c1. If a PSNP is sent for a LSP on interface c2, backup instance clears the SSN flag for this LSP on interface c2.

This implementation adds complexity to the IS-IS HA design, but speeds the fail-over recovery process.

FIG. 5 is a flow diagram depicting the third or recovery synchronization phase 403 of HA IS-IS. When PM 29-1, 29-2 detects that the active failed at step 501, IS-IS is notified of the failure. When backup DRP receives fail-over notification, it triggers HA-aware applications to start the recovery sequence. Backup 25-2a, 25-2b then immediately assumes the active role at step 502, and subsequent recovery is divided into three different stages, namely begin stage, recovery stage, and end stage. At the begin stage, backup IS-IS performs the following tasks:

Change to IS-IS active state at step 502 to allow IS-IS to run many activities previously blocked on backup.

Transmit new "Hello" PDU. In the Chiaro system, for example, the transmit "Hello" PDU function is offloaded to OS kernel, so the new "Hello" PDU is downloaded to OS kernel at step 503. The new "Hello" PDU contains the correct neighbor information.

Check the local LSP refresh interval. If refresh time is due, refresh the local LSP to peers at step 504 to prevent expiring during recovery.

Examine the SRM and SSN flag on each LSP in the LSP database at step 505. If the SRM and/or SSN flag is set, the LSP is added to the LSP transmit queue or the PSNP transmit queue.

Register the redistribution process function as a background task at step 507.

Add configured summary address to the proper non-pseudonode LSP at step 508. The summary address is activated when it is suppressing a specific route.

At the begin stage, IS-IS backup assumes an active role and immediately updates "Hello" PDU. It checks the SRM flag and the SSN flag, and continues to transmit LSP/PSNP which have not been transmitted by the active. If the local node is a DR, then it will start sending CSNP.

In the recovery stage, all adjacencies are added to the hold time list and the DR election is called at step 509. All internal period timers are enabled at step 510. IS-IS instance triggers SPF at step 511 and redistribution from RIB at step 512. The IS-IS instance, when it is in the backup role, maintains a LSP database, which would be provided essentially by the active and by peer routers. The backup also maintains a separate copy of its locally generated LSP. In the recovery stage, although the local LSPs are updated, a local LSP generated by the new active instance is not added to the LSP database. The local LSPs are still premature due to lack of redistribution information from IS-IS and/or other routing protocols. At step 513, local LSP pseudonode and non-pseudonode databases are created.

Once all the individual peer routes are calculated by all the routing protocols on MCP, the IS-IS instance is informed by the HA node to go to the ending stage. At this time, redistributed routes have been added into each IS-IS's redistribution list. A HA redistribute marker is added at the end of the route redistribution list. When IS-IS processes the redistribution list and encounters the HA redistribute marker, this indicates that IS-IS has finished processing route redistribution among DRPs. At step 515, after all DRPs finish routing update and IS-IS has completed the redistribution process, the local LSPs generated by previous active IS-IS instance in the LSP database are replaced by locally generated LSPs created by the new active instance. Optionally, if the content is different, at step 514 the new LSP uses the old LSP sequence number+1. If a LSP (non-zero LSP) is no longer used, then this LSP is purged.

At step 516, backup IS-IS instance has assumed all the active IS-IS instance functions and the recovery synchronization is ended.

There are number of scenarios that require special handling.

When the IS-IS instance is created on active via CLI command, if active MCP is in the protected mode, a START SYNC message is sent to backup. The backup can receive the START SYNC message before it receives the IS-IS instance creation command from CLI script server. In this case, the START SYNC message is used as a "router IS-IS" CLI command. Backup creates an IS-IS instance and then sends the START SYNC response message to active.

When IS-IS is enabled on an interface via the "ip router IS-IS" command, active creates the IS-IS circuit structure and starts immediately to send "Hello" PDU. After a delay time, IS-IS is also enabled on the interface on backup, since all CLI commands are executed on active first and then, if successful, are sent to the backup for execution. When the three-way handshake feature is enabled, backup may miss the first handshake and stay in the DOWN state, while active is in the UP state.

The problem is solved by a per interface synchronization process. On a protected system, when IS-IS is enabled on active and backup, it marks the interface as synchronization-required. When backup receives the first IS-IS PDU on the synchronization-required interface, it sends a synchronization message to active and clears its own synchronization-required flag. Once the interface on active receives the interface synchronization message, it also clears the interface synchronization flag. On active, if the interface is marked as synchronization-required, active refuses to establish any new adjacency until active and backup complete the interface synchronization.

Normally all CLI commands issued from the active instance side are sent to active MCP and then sent to backup MCP. Most commands cannot be directly issued on Backup, except certain "show" or "debug" commands.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of highly-available Intermediate System to Intermediate System (HA IS-IS) routing in a network, comprising the steps of:

creating a backup IS-IS instance running on a Master Control Processor (MCP) platform;

creating local link state PDU (LSP) initially synchronizing the state of said backup IS-IS instance with the state of an active IS-IS instance running separately on said Master Control Processor (MCP) platform and linked with said backup IS-IS instance;

dynamically synchronizing the ongoing state of said backup IS-IS instance with said active IS-IS instance using a combination of explicit message updates from said active IS-IS instance to said backup IS-IS instance together with a message flow-through mechanism;

and in the event of protected fail-over of said active IS-IS instance, then seamlessly recovering from said fail-over without reconfiguring or interrupting traffic among peer routers in said network, by functionally substituting and recovery synchronizing said backup IS-IS instance for said protected active IS-IS instance, such that said recovery synchronized backup IS-IS instance establishes itself as the new active IS-IS instance, changing the role of said backup IS-IS instance to active, downloading "Hello" packets to an operating system kernel, retransmitting local LSPs to peer IS-IS routers when the respective LSP refresh interval expires, examining an SRM and SSN flag on each LSP, and adding configured summary address to proper non-pseudonode LSPs; and building LSP and PSNP transmit queues.

2. The method of claim 1 wherein said step of recovery synchronizing further comprises conducting a designated router election.

3. The method of claim 2 wherein said step of recovery synchronizing further comprises building pseudonode and non-pseudonode LSPs.

4. The method of claim 3 wherein said step of recovery synchronizing further comprises starting a Shortest Path First (SPF) algorithm.

5. The method of claim 4 wherein said step of recovery synchronizing further comprises maintaining two LSP databases, a local LSP database being generated by the currently active MCP and a previous LSP database being from the previous active MCP.

6. The method of claim 5 wherein said step of recovery synchronizing further comprises: if content is changed, setting sequence number of local generated LSP to previous LSP sequence number plus one; inserting said local generated LSP into LSP database; removing previous LSP; and purging unused LSP.

7. A system for highly-available Intermediate System to Intermediate System (HA IS-IS) routing in a network, comprising a local IS-IS router and peer IS-IS routers, said local IS-IS router including:

a Master Control Processor (MCP) platform containing an active IS-IS instance running on an active MCP and a backup IS-IS instance running on a separate backup MCP, said backup IS-IS instance connected with said active IS-IS instance through HA nodes linked together through a MCP network (MNET);

a plurality of line cards interconnected with said MCP platform through a routing network (RNET), said line cards operable to use routing tables to distribute protocol and transit traffic data packets among said peer IS-IS routers;

and a message flow-through architecture, such that if said active MCP is operated as a standalone system, then all incoming protocol control traffic is configured to flow directly between said line cards and said active MCP; whereas if said active MCP is protected by said backup MCP, then all incoming protocol control traffic from said peer network routers through said line cards is configured to flow first through said backup MCP before flowing to said active MCP, and all protocol control traffic originating at said active MCP is configured to flow first through said backup MCP before being distributed through said line cards among said peer network routers.

8. The system of claim 7 wherein said MNET comprises a GbE Ethernet connection.

9. The system of claim 7 further comprising a RS232 serial link interconnecting said active MCP and said backup MCP.

* * * * *